(12) United States Patent
Kapany

(10) Patent No.: US 6,463,192 B1
(45) Date of Patent: Oct. 8, 2002

(54) NON-BLOCKING MICRO-OPTIC SWITCH MATRIX FOR USE IN FIBER OPTIC SYSTEMS

(75) Inventor: Narinder Kapany, Woodside, CA (US)

(73) Assignee: K2 Optronics, Inc., Palo Alto, CA (US)

(*) Notice: Subject to any disclaimer, the term of this patent is extended or adjusted under 35 U.S.C. 154(b) by 0 days.

(21) Appl. No.: 09/794,319

(22) Filed: Feb. 26, 2001

(51) Int. Cl.[7] .................................................. G02B 6/35
(52) U.S. Cl. ............................................. 385/17; 385/18
(58) Field of Search ............................... 385/16–18, 14, 385/31, 39, 47; 359/222

(56) References Cited

U.S. PATENT DOCUMENTS

| | | | |
|---|---|---|---|
| 4,478,494 A | 10/1984 | Soref | 359/320 |
| 4,580,873 A | 4/1986 | Levinson | 385/17 |
| 4,630,883 A | 12/1986 | Taylor et al. | 385/47 |
| 4,674,828 A | 6/1987 | Takahashi et al. | 385/18 |
| 4,681,397 A | 7/1987 | Bhatt | 385/17 |
| 4,714,326 A | 12/1987 | Usui et al. | 359/222 |
| 4,846,542 A | 7/1989 | Okayama et al. | 385/17 |
| 5,221,987 A | 6/1993 | Laughlin | 359/222 |
| 5,255,332 A | 10/1993 | Welch et al. | 385/17 |
| 5,283,844 A | 2/1994 | Rice et al. | 385/17 |
| 5,581,643 A | 12/1996 | Wu | 385/17 |
| 5,699,462 A | 12/1997 | Fouquet et al. | 385/18 |
| 5,960,131 A | 9/1999 | Fouquet et al. | 385/17 |
| 5,999,307 A | 12/1999 | Whitehead et al. | 359/298 |
| 6,022,671 A | 2/2000 | Binkley et al. | 430/321 |
| 6,154,586 A | 11/2000 | MacDonald et al. | 385/18 |
| 6,345,132 B1 * | 2/2002 | Picard et al. | 385/18 |
| 6,356,679 B1 * | 3/2002 | Kapany | 385/18 |

FOREIGN PATENT DOCUMENTS

| | | | |
|---|---|---|---|
| EP | 0310184 A1 | 4/1989 | |
| EP | 0907091 A2 | 4/1999 | G02B/6/293 |
| JP | 63-197923 | 8/1988 | |
| JP | 2-179621 | 7/1990 | |

* cited by examiner

Primary Examiner—Rodney Bovernick
Assistant Examiner—Michael J. Stahl
(74) Attorney, Agent, or Firm—Townsend and Townsend and Crew LLP

(57) ABSTRACT

The non-blocking micro-optic switch matrix (NMSM) includes a plurality of optical routing elements (OREs) forming an M×N matrix. Each ORE of the plurality includes a first and second wafer prism having a gap disposed therebetween. A body of transparent solid material disposed in the gap has a contracted state at a first temperature and an expanded state at a second temperature. The contracted state defines an air gap in the path of light traveling along a first axis, causing light to be deflected along a second axis through total internal reflection. The first and second axes are at a non-zero angle with respect to one another. The expanded state of the transparent material removes the air gap disposed in the path of light traveling along the first axis allowing light to pass through the first wafer prism, through the body of transparent material and into the second wafer prism.

44 Claims, 12 Drawing Sheets

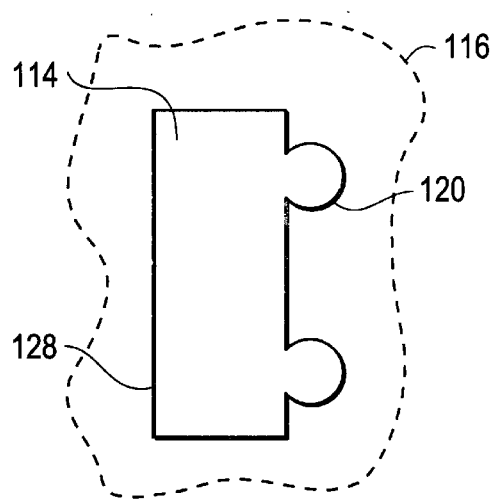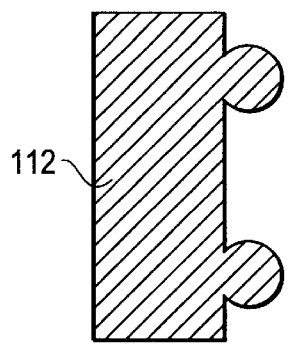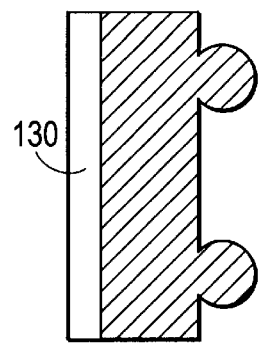
Fig. 12A  Fig. 12B  Fig. 12C
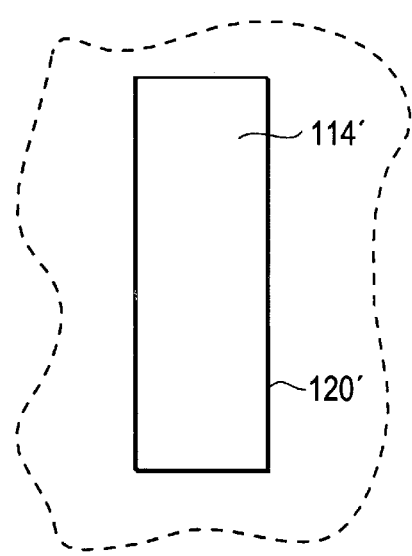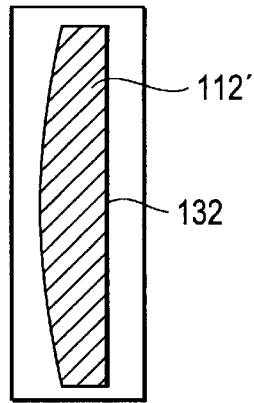
Fig. 13B
Fig. 13A
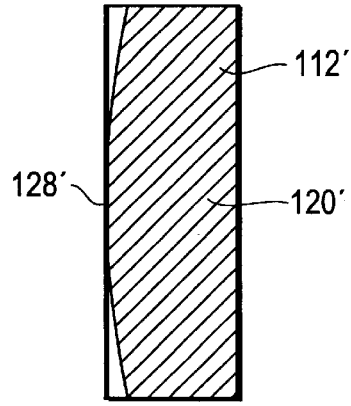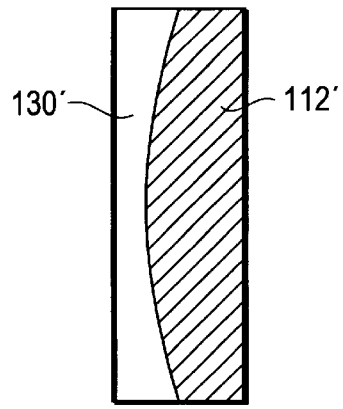
Fig. 13C  Fig. 13D

NON-BLOCKING MICRO-OPTIC SWITCH MATRIX FOR USE IN FIBER OPTIC SYSTEMS

BACKGROUND OF THE INVENTION

This application relates generally to fiber optics and more specifically to fiber optic switching devices.

For high bandwidth fiber optics communication systems, an important functional requirement is the ability to switch optical signals with low loss and low crosstalk. That is, an effective optical switch should switch a significant fraction of the light to the intended channel and substantially none of the light to unintended channels. Crosstalk is typically expressed in terms of attenuation (measured in decibels or dB), and −50 dB is generally considered a target performance level. One such optical switch is a crossbar switch. A crossbar switch is a matrix of switching elements (also referred to as optical routing elements) for switching optical signals from a set of signal-carrying input optical fibers to a set of output optical fibers. A beneficial functionality for crossbar switching is having switching elements that are non-blocking, i.e., two optical signals traveling along different optical axis can pass through a switching element without either signal being blocked by the element. In addition to the functional performance characteristics mentioned above, it is desirable that the switch be fast, reliable, compact, and inexpensive.

Prior art optical switches include (1) opto-mechanical devices (using moving micro-optics), (b) thermo-optical polymer waveguides, (c) micro-electromechanical switches (MEMS), and (d) index matching fluid with movable bubbles in trenches in a planar waveguide. While all of these technologies have been demonstrated for optical switches, considerable efforts are still ongoing to develop an all optical switch matrix characterized by low loss and crosstalk, non-blocking, high speed and reliability, small overall size, and low cost.

As is well known, typical single-mode fiber optics communications are at wavelengths in the 1300-nm and 1550-nm ranges. The International Telecommunications Union (ITU) has defined a standard wavelength grid having a frequency band centered at 193,100 GHz, and other bands spaced at 100 GHz intervals around 193,100 GHz. This corresponds to a wavelength spacing of approximately 0.8 nm around a center wavelength of approximately 1550 nm, it being understood that the grid is uniform in frequency and only approximately uniform in wavelength. Implementation at other grid spacings (e.g. 25 GHZ, 50 GHz, 200 GHz, etc.) are also permitted. This frequency range and frequency spacings provides an enormous bandwidth for use in audio, video, audio-video as well as other communications needs such as the Internet and provides an impetus to develop optical technologies to exploit such bandwidth, such as switch matrices with characteristics as previously listed.

SUMMARY OF THE INVENTION

The present invention provides a non-blocking micro-optic switch matrix (NMSM) characterized by low insertion loss, low cross talk, ease of manufacture, and low cost.

The NMSM includes a plurality of optical routing elements (OREs) forming an M×N matrix. The matrix has M rows and N columns, each row has N OREs and each column has M OREs. M and N may or may not be equal. Each ORE in a row may be optically coupled to the other OREs in the row, and each ORE in a column may be optically coupled to the other OREs in the column.

In one embodiment, each ORE has first and second wafer prisms that define a routing region. A gap disposed between the wafer prisms has a front and back bounded respectively by the first and second wafer prisms, and sides bounded by a pair of spacer elements. The gap is occupied by a thermal expansion element (TEE) that includes a body of material (such as polymer material) having contracted and expanded states at respective first and second temperatures. The contracted state defines an air gap disposed in the path of light traveling along a first optic axis that passes through both the first and second wafer prisms, such that the light is deflected by total internal reflection along a second optic axis that is at a non-zero angle with respect to the first optic axis. The expanded state removes the air gap so as to allow the light traveling on the first optic axis to pass through the first wafer prism and to further pass through the body of transparent material into the second wafer prism.

A further embodiment of the non-blocking micro-optic switch matrix is constructed of a silica wafer structure optionally disposed on a substrate. The silica wafer structure is formed with recesses or trenches in which the OREs are disposed.

In yet a further embodiment of the non-blocking micro-optic switch matrix, a first plurality of waveguide segments are optically coupled to a first optical routing element in each row of the M×N matrix of OREs in a one-to-one manner. Additionally, a second plurality of waveguide segments are optically coupled to a last optical routing element in each column of the M×N matrix of OREs in a one-to-one manner.

A further understanding of the nature and advantages of the present invention may be realized by reference to the remaining portions of the specification and the drawings.

BRIEF DESCRIPTION OF THE DRAWINGS

FIGS. 12A, 12B, and 12C are schematic plan views of a process by which thermal expansive elements may be formed; and FIGS. 13A, 13B, 13C, and 13D are schematic plan views of a process by which thermal expansive elements may be formed.

DESCRIPTION OF THE SPECIFIC EMBODIMENTS

Non-blocking Micro-Optic Switch Matrix (NMSM) Architecture and Operation

Figure 1A:
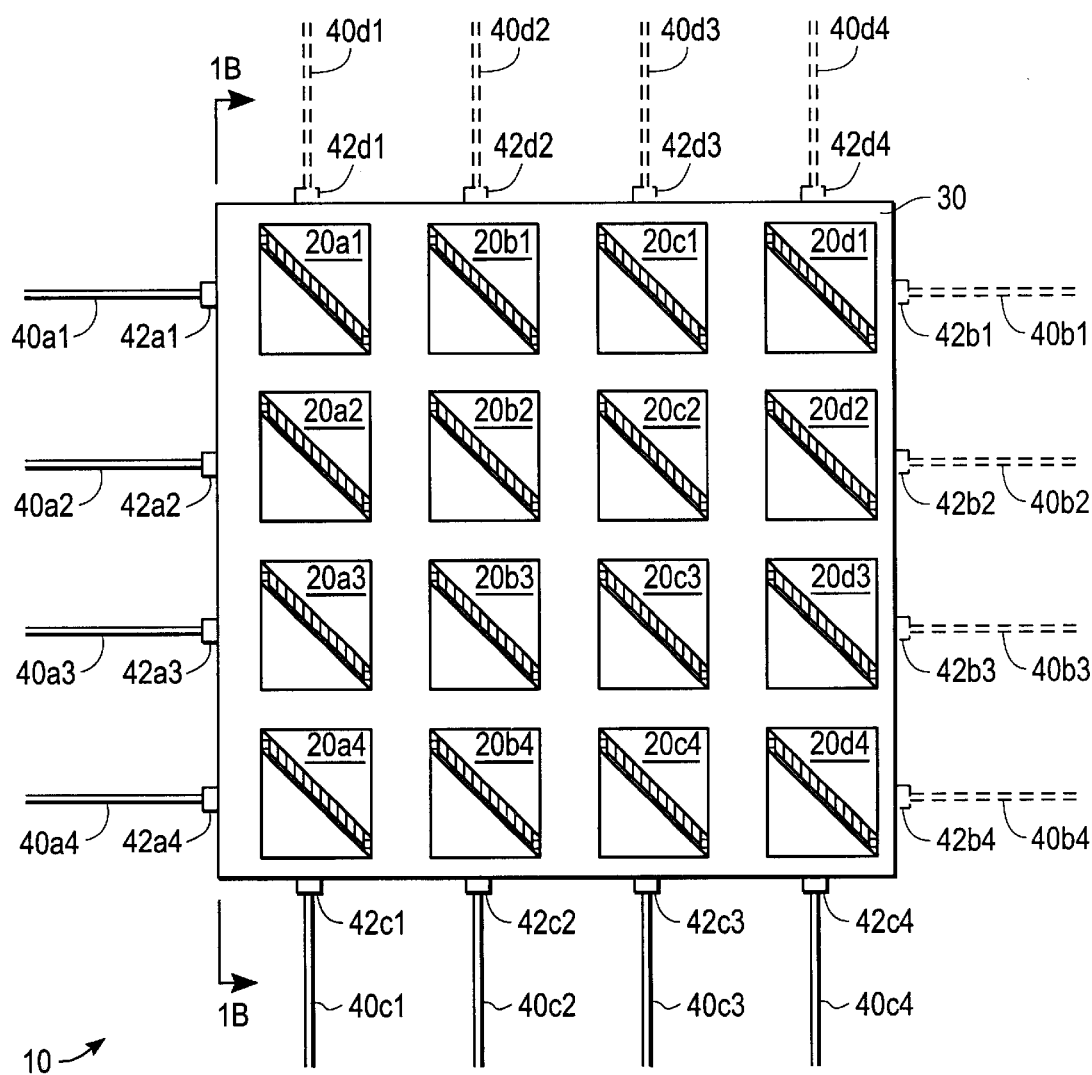
FIGS. 1A and 1B are schematic top and side views of a non-blocking micro-optic switch matrix.
Figure 1B:
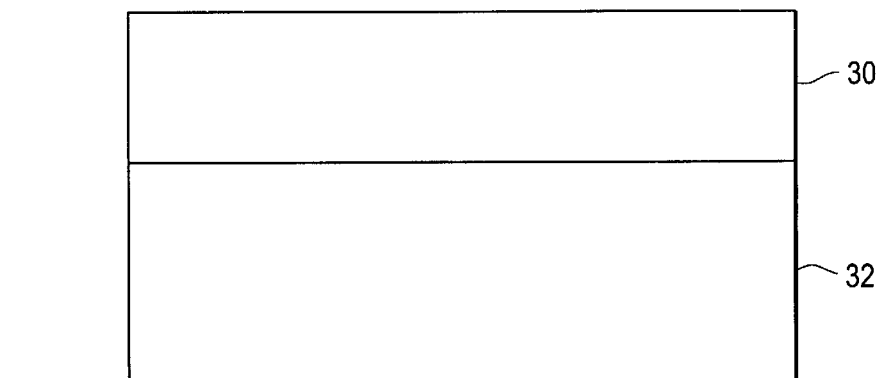

FIGS. 1A and 1B are schematic top and side views of a non-blocking micro-optic switch matrix (NMSM) 10 according to a switch embodiment of the present invention. NMSM 10 includes a plurality of optical routing elements (OREs) 20 arranged in an array or matrix. Each ORE 20 is shown with a suffixed reference numeral, with a first suffix (a, b, c, d, . . . ) designating the column position and a second suffix (1, 2, 3, 4, . . . ) designating the row position. As illustrated, the non-blocking micro-micro optic switch matrix is a square (N×N) matrix of OREs, having four rows and four columns, but matrices of lower or higher dimensions may also be useful. Additionally, matrix dimensions that are non-symmetric, i.e., M×N matrices (where M and N are unequal), are of use in some devices and applications.

Figure 1C:
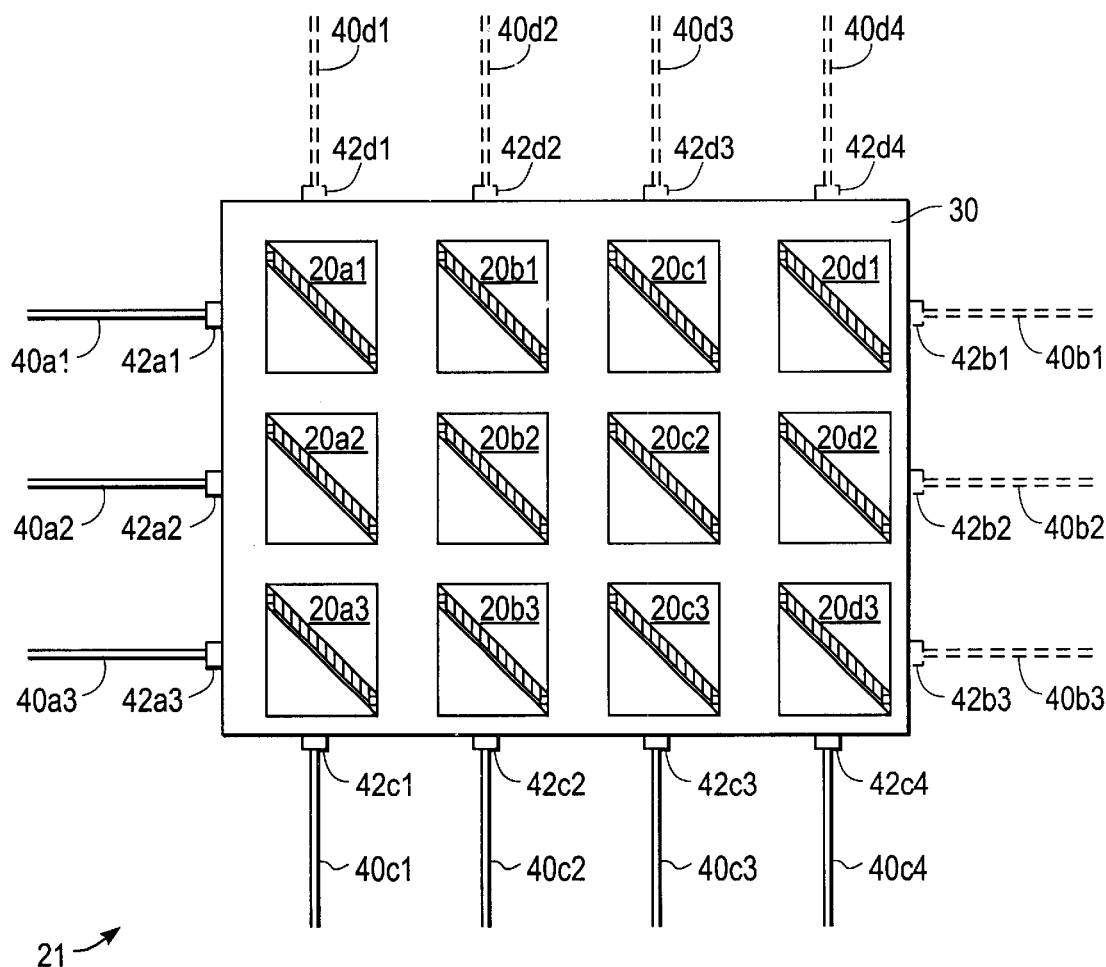
FIG. 1C is schematic plan view of a non-blocking micro-optic switch matrix having unequal numbers of rows and columns.

FIG. 1C shows a schematic plan view of a non-blocking NMSM 21 according to a switch embodiment of the present invention for which the switch has unequal numbers of rows and columns. As illustrated, and by way of example, NMSM 21 has three rows and four columns of OREs. As illustrated, NSMS 21 has fewer rows than columns, but in some embodiments the number of rows may be greater than the number of columns. The OREs are designated in accord with the previous numbering regime shown in FIG. 1A.

The basic functionality of each ORE is to receive light incoming from a first direction, arbitrarily shown as coming from the left, and selectively pass it onto a through path (i.e., to the right), or deflect it onto a switched path (shown as downwardly extending). Each ORE can be controlled to assume first and second states that determine whether light will travel onto a through path or onto a switched path.

An additional functionality of each ORE is to receive light incoming from a second direction, arbitrarily shown as coming from the top, and selectively pass it onto a through path (i.e., shown as downwardly extending), or deflect it onto a switched path, (i.e., to the right). As previously mentioned, each ORE can be controlled to assume first and second states that determine whether light will travel onto a through path or onto a switched path.

In a specific construction, the OREs are disposed in recesses formed in a silica wafer structure 30. The use of a silica wafer structure with recesses provides for fewer optical alignments during manufacture than crossbar switches coupling optical routing elements by other means, such as optical fibers. The recesses may be coterminous with an ORE or may be of slightly larger dimension such that refractive index matching glues can hold the OREs in position. Making the recesses slightly larger than each ORE provides for alignment capability at each ORE site.

The recesses can be formed by numerous methods, such as those currently known in the plasma etch arts, or by the use and methods of diamond wire cutting, or by other appropriate methods. In some embodiment apertures may be made in the silica wafer structure for placement of OREs. The methods listed above for recess formation are also applicable to aperture formation. Aperture formation provides easy access to the sides of the aperture should the sides need to be polished.

FIG. 1B shows a side view of an embodiment of an NMSM 10 in FIG. 1A taken along line 1B—1B for which silica wafer structure 30 is disposed on a substrate 32. The use of a substrate provides additional structural rigidity to the switch matrix. The substrate may also provide a mounting surface for OREs in embodiments of an NMSM in which apertures are formed in the silica wafer structure.

In a further specific construction of an NMSM, OREs are disposed on the surface of a substrate device such as a silica wafer structure or other suitable substrate device and may either be directly optically coupled to each other or may be glued to each other with refractive index matching glues.

A first plurality of waveguide segments $40a1 \ldots 40a4$ serves as a set of input waveguide segments and receives optical signals from the left as shown in FIG. 1A. The signals are received from other non-pictured optical devices, such as other NMSMs, optical multiplexers and networks, signal generators, or the like. The input waveguides in turn deliver the optical signals to the ORE matrix (more specifically to the first OREs $20a1 \ldots 20a4$ in each row). A second plurality of waveguide segments $40c1 \ldots 40c4$ serves as a set of output waveguide segments and receives the optical signals from the ORE matrix (more specifically from the last OREs $20a4 \ldots 20d4$ in each column). The output waveguide segments in turn deliver the signals to other optical devices such as those mentioned previously.

In a crossbar switch application optical signals coming in from the left on waveguide segments $40a1 \ldots 40a4$ are mapped to waveguide segments $40c1 \ldots 40c4$ in a one-to-one manner. Thus waveguide segments $40a1 \ldots 40a4$ and $40c1 \ldots 40c4$ are the only necessary waveguide segments. However, other applications may use additional switching, and additional waveguide segments are shown in phantom. For example, in some switch matrix applications, a set of through paths is useful and a third plurality of waveguide segments $40b1 \ldots 40b4$ is provided as a second set of output waveguide segments. Output waveguide segments $40b1 \ldots 40b4$ receive optical signals from the last OREs $20d1 \ldots 20d4$ in each row. As this third plurality of waveguide segments is not needed in a crossbar switch application, waveguide segments $40b1 \ldots 40b4$ are shown in phantom.

For yet other switch matrix applications, a secondary input path is useful and a fourth plurality of waveguide segments $40d1 \ldots 40d4$ is provided for delivering optical signals to the first OREs $20a1 \ldots 20d1$ in each column. The fourth plurality of waveguide segments provide a feature whereby optical signals can be introduced into the switch matrix from the top. As a secondary input path is not needed in a crossbar switch application, waveguide segments $40d1 \ldots 40d4$ are shown in phantom.

Each of the waveguide segments may be an optical fiber, monolithic planar waveguide, or other suitable waveguide material. In some embodiments, particularly those having waveguide segments that are optical fibers, collimators $42a1-42a4$, $42c1-42c4$, $42b1-42b4$, and $42d1-42d4$ may be disposed between the respective waveguides and silica wafer structure 30 as shown in FIG. 1A. Such collimating devices are preferably gradient index of refraction (GRIN) lenses but may be spherical dielectric lenses or any other collimating devices. A GRIN lens is typically a transparent, cylindrical device formed from glass or other transparent medium having a parabolically varying index of refraction along a radius extending from the central axis of the cylinder to the surface of the cylinder. Typically the refractive index along the central axis is higher than the index of refraction away from the central axis.

While FIG. 1A shows the waveguide segments and collimators as discrete elements, they may be fabricated as a single structure. Further, while FIG. 1A shows the waveguide segments and/or collimators coupled to the periphery of the silica wafer structure, the silica wafer may be further etched or cut allowing the waveguide segments and/or collimators to be directly coupled to the peripheral OREs.

Figure 2A:
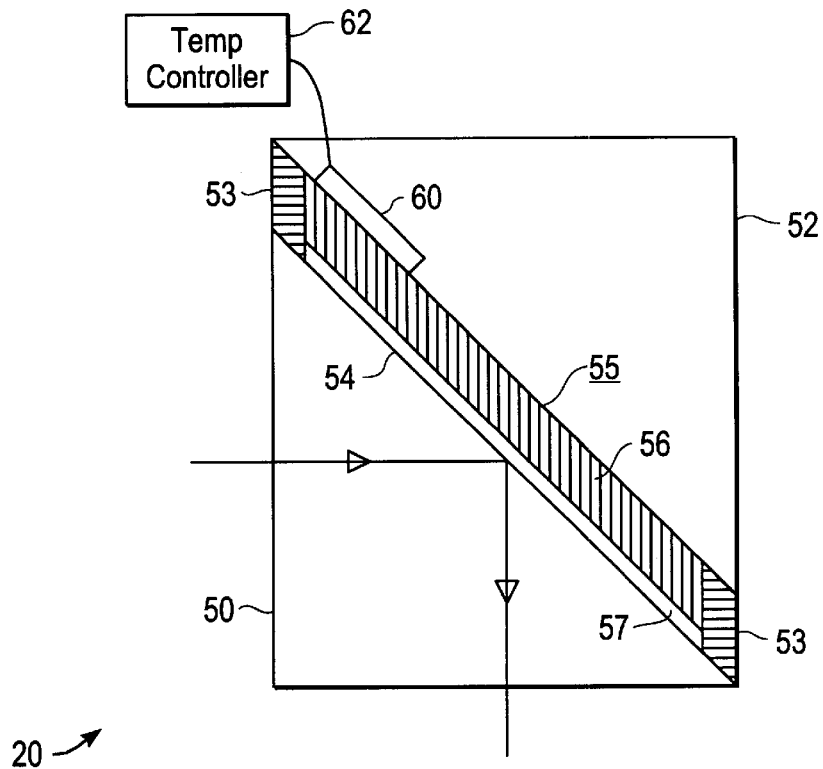
FIGS. 2A and 2B are schematic plan views of the operative states of an ORE.
Figure 2B:
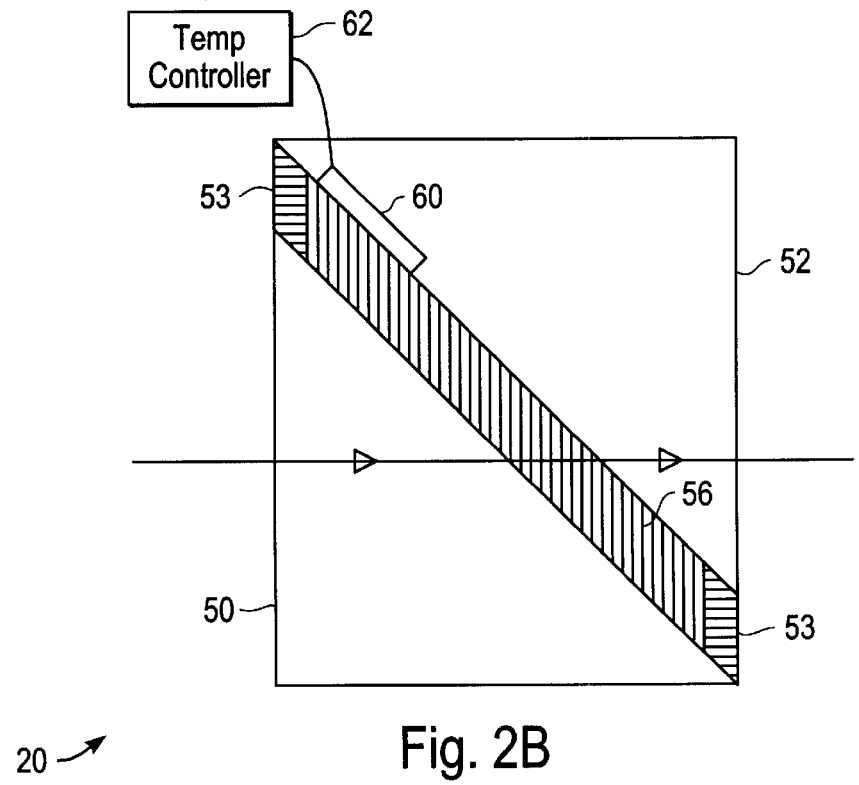

FIGS. 2A and 2B are detailed schematic plan views of the operative states of a single ORE 20. The ORE in FIGS. 2A and 2B is shown in the same orientation as the OREs in the array shown in FIG. 1A. ORE 20 includes a first wafer prism 50 and a second wafer prism 52 defining a routing region. While wafer prisms 50 and 52 are shown as right triangles, other triangular configurations are of use. In a preferred embodiment of the present invention the wafer prisms have equilateral triangular dimensions. Spacer elements 53 (shown with horizontal hatching marks) keep the wafer prisms at a fixed distance apart such that a gap is defined between the prisms. The gap has a front surface 54 bounded by wafer prism 50, a back surface 55 bounded by wafer prism 52, and the sides of the gap are bounded by the spacer elements. The gap is preferably in a range of about 100–200 micrometers, though other gap dimensions are useful. A thermal expansion element (TEE) 56 (shown with vertical hatching marks) is disposed in the gap between the wafer prisms. Further, the TEE is attached to the second wafer prism such that optical coupling occurs between the TEE and prism. Attachment may be achieved by refractive index matching glues, mechanically applied pressure, mechanical capture, or by other appropriate means.

TEE 56 includes a body of material that has a contracted state at a first temperature T(low) and an expanded state at a second temperature T(high). As shown in FIG. 2A, when the TEE is in its contracted state, it defines an air gap 57 in the path of light entering from the left. Light traveling from the left is collinear with a first optic axis of the ORE. Contraction of the TEE causes such light to undergo total internal reflection in prism 50 and be deflected downwardly to travel collinearly with, or parallel to, a second optic axis of the ORE. As will be described in detail below, in a preferred embodiment the first and second optic axes of each ORE intersect at an angle of 120°. The gap is of a width such that evanescent waves entering the gap are minimally coupled to the TEE so as to provide a desirable low level of insertion loss and crosstalk. Though evanescent waves are well understood by those of ordinary skill in the art, they are further discussed below.

As shown in FIG. 2B, when the TEE is in its expanded state, it fills the air gap, thereby allowing the light to pass through the TEE into the second wafer prism 52. The TEE material preferably has an index of refraction that matches the refractive index of the wafer prisms. Thus, when the TEE is in its expanded state, insertion loss and crosstalk are minimized to desirable low levels.

Moreover, as the TEE is transparent and preferably index matched with the wafer prisms, optical signals that enter an ORE from the top are not "blocked" from passing through the ORE. As such, it is noted that switch matrices using OREs that have TEEs are particularly well suited to crossbar switch embodiments and to embodiments having a third or fourth plurality of waveguide segments. For example, consider the case when a given TEE is in its expanded state and the TEE above it is in its contracted state. The given TEE thus transmits light from left to right (in the plane of the drawing), while the TEE above the given TEE reflects light downwardly (in the plane of the drawing). This reflected light passes through the given TEE, which is in its expanded state, without interference. Thus, a switch matrix having OREs that use TEEs is a non-blocking switch matrix.

Temperature control of a TEE and hence its expansion or contraction is suitably controlled by a temperature control element 60, (having an associated temperature controller 62). FIGS. 2A and 2B show temperature control element 60 thermally coupled to the TEE of ORE 20 in order to control the state of the TEE. Each ORE has a unique temperature control element and temperature controller. In some embodiments, the temperature control element is a resistive heater, so that the TEE is caused to switch from its contracted state to its expanded state by application of current to the heater. However, in other embodiments, the temperature control element could be a thermoelectric cooler element, so that the TEE is caused to switch from its expanded state to its contracted state by application of current to the cooler. It is also possible to provide a heater and cooler for temperature control. The temperature control element may also be a radiative source, the radiation from which is absorbed by the TEE causing it to switch from its contracted state to its expanded state. The temperature controller 62 for a radiative source, may be any device to regulate the radiative power and/or radiative energy emanating from the radiative source. Specific embodiments of temperature control element 60 are discussed below.

Figure 3:
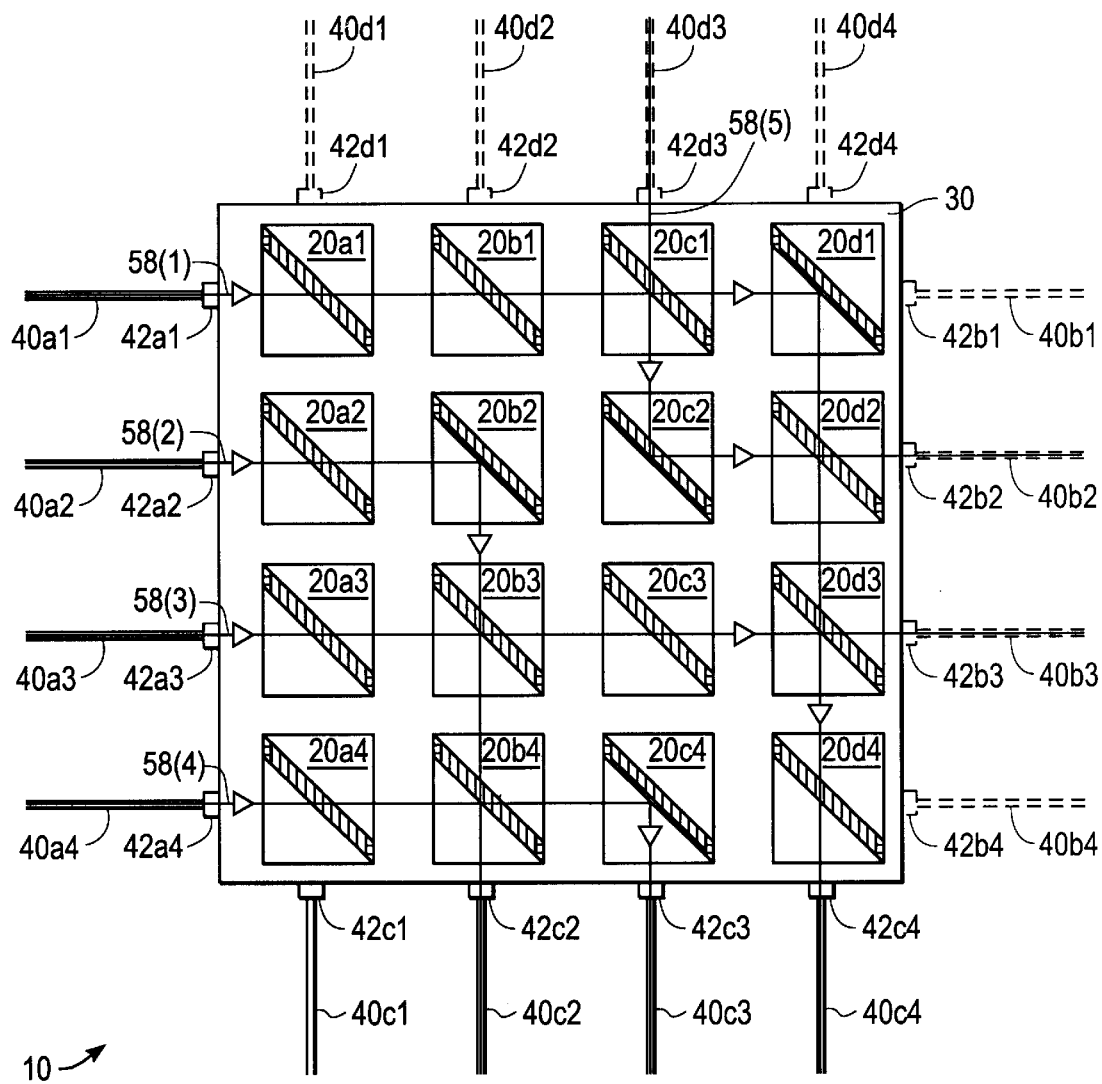
FIG. 3 is a schematic plan view of an operative state of a non-blocking micro-optic switch matrix.

FIG. 3 shows an example operative state of NMSM 10 with OREs, 20a1 . . . . 20d4, having TEEs 56 in various states of expansion and contraction. The optical signals input to the NMSM on waveguide segments 40a1, 40a2, 40a3, 40a4, and 40d3 are designated 58(1), 58(2), 58(3), 58(4), and 58(5) respectively. Optical signal 58(1) is introduced to the NMSM through waveguide segment 40a1 and is transmitted by OREs 20a1, 20b1 and 20c1, (having their TEEs in expanded states) and undergoes total internal reflection at ORE 20d1 (having its TEE in a contracted state). The signal is further transmitted by OREs 20d2, 20d3, and 20d4 (having their TEEs in expanded states) into waveguide segment 40c4 and exits the NMSM traveling downward. In another example, optical signal 58(5) is introduced to the NMSM through waveguide segment 40d3, is transmitted by ORE 20c1 (having its TEE in an expanded state), and is reflected by ORE 20c2 (having its TEE in a contracted state). The signal is further transmitted by ORE 20d2 (having its TEE in an expanded state) into waveguide segment 40b2 and exits the NMSM traveling right. Optical signals 58(2), 58(3), and 58(4) are shown to undergo similar switching according to the states of the TEE they encounter.

Figure 4A:
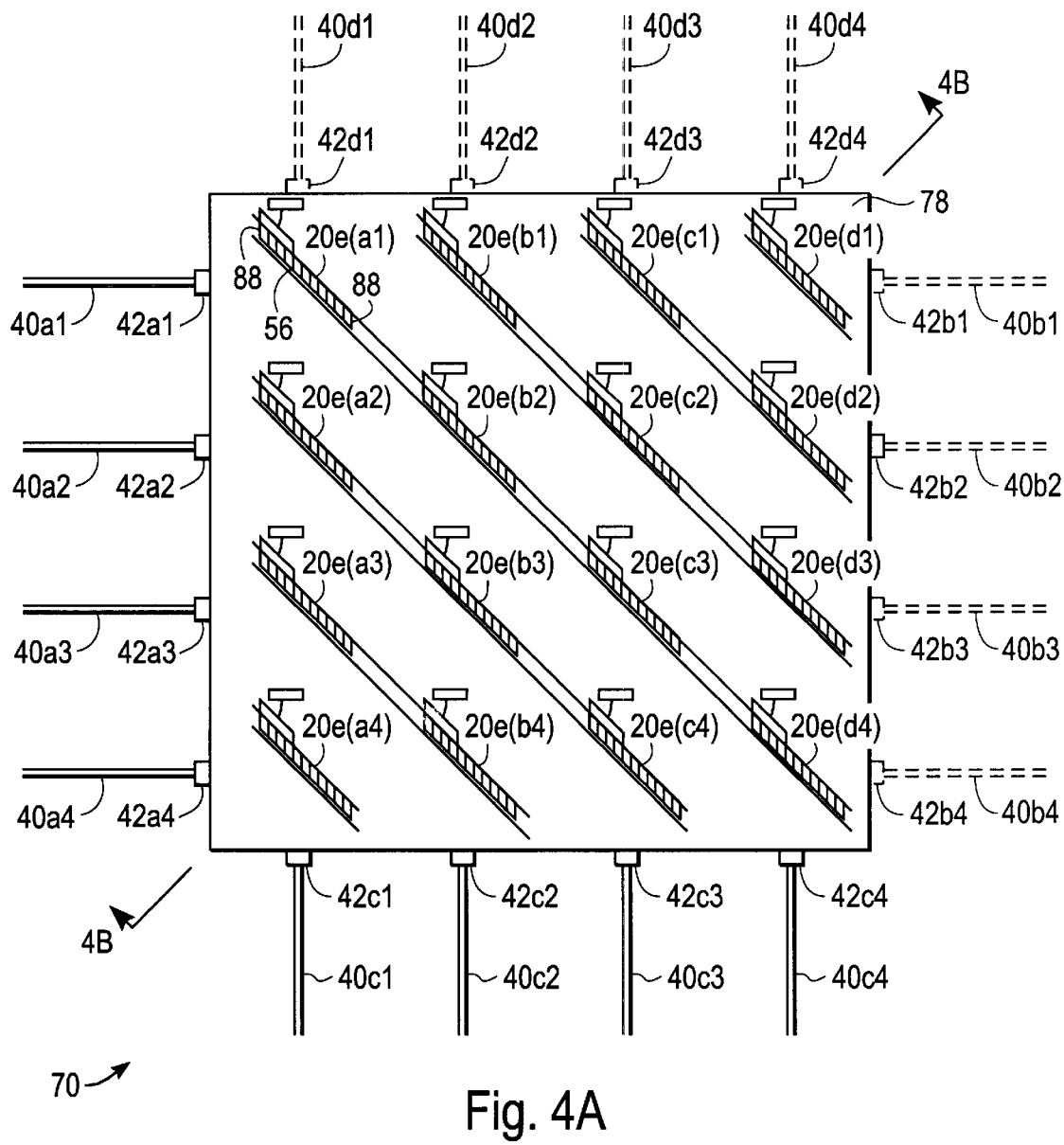
FIGS. 4A and 4B are schematic top and cross sectional views of a non-blocking micro-optic switch matrix.
Figure 4B:
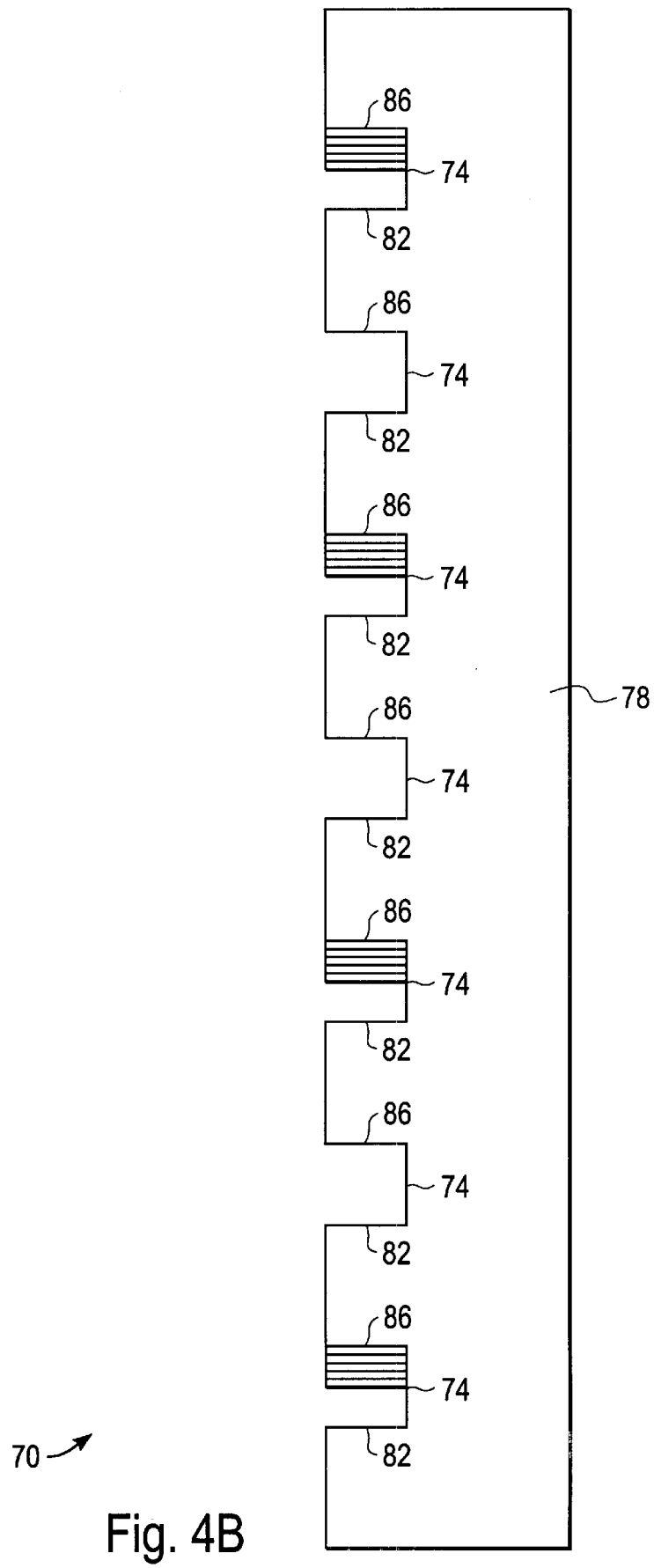

FIGS. 4A and 4B are schematic top and side views of yet a further specific construction of an NMSM 70 according to the present invention. In this embodiment, the OREs are constructed differently, and are given a base reference numeral 20e. NMSM 70 includes ORE 20e arranged in a rectangular array or matrix. Each ORE 20e is shown with a suffixed reference numeral, with a first suffix (a,b,c,d, . . . ) designating the column position and a second suffix (1,2,3,4, . . . ) designating the row position. As similarly described above and by way of example, NMSM 70 is shown as a square (N×N) matrix of OREs, having four rows and four columns. Matrices of higher of higher or lower dimensions may be of use in some devices as well as matrices of non-symmetric dimensions, i.e., M×N matrices, where M and N are unequal.

As similarly described above, the basic functionality of each ORE 20e is to receive light incoming from a first direction, arbitrarily shown as coming from the left, and selectively pass it onto a through path (i.e., to the right), or deflect it onto a switched path, (shown as downwardly extending). Each ORE can be controlled to assume first and second states that determine whether light will travel onto a through path or onto a switched path.

In a specific construction, the OREs are disposed in a plurality of trenches 74 formed in a silica wafer structure 78. FIG. 4B shows silica wafer structure 78 in a cross sectional view of NMSM 70 in FIG. 4A taken along line 4B—4B.

Each trench 74 has front and back bounding surfaces 82 and 86. The front and back bounding surfaces of each trench have approximately parallel surfaces and each trench has front and back bounding surfaces substantially parallel to the bounding surfaces of every other trench. Surfaces 82 in some embodiments may be coated with a non-stick layer such as polytetrafluoroethylene. As similarly discussed above with regard to recesses formed in silica wafer structures, trenches in silica wafer structures can be formed by numerous methods, such as those currently known in the plasma etch arts, or by the use and methods of diamond wire cutting, or by other appropriate techniques.

Each trench preferably has a space between the front and back bounding surface in a range of about 100–200 micrometers, though other trench dimensions are useful. Each ORE 20e includes a thermal expansion element (TEE) 56 (shown with vertical hatching marks). By way of example, TEE 56 is indicated on ORE 20e(a1), although the TEE of each ORE could be so designated. Moreover, the TEE are designated in accord with the previous numbering regime and the TEE shown in FIGS. 4A and 4B correspond to the TEE shown in FIGS. 2A and 2B. All previously described TEE attributes are present in the TEE of NMSM 70. Additionally though, each TEE of each ORE has sides designated as 88. By way of example, the designation for the sides of a TEE is indicated on ORE 20e(a1), though the sides of each TEE of each ORE could be so designated.

Each TEE is attached to the back bounding surface of the trench in which it is disposed, such that optical coupling occurs between the TEE and back bounding surface. attachment may be achieved by refractive index matching glues, mechanically applied pressure, mechanical capture, or by other appropriate means.

Temperature control of a TEE and hence its expansion or contraction is suitably controlled by temperature control element 60, (having an associated temperature controller 62). The temperature control elements 60 and temperature controllers 62 are designated in accord with the previous numbering regime and correspond to the elements and controllers shown in FIGS. 2A and 2B.

Upon expansion, a TEE will optically couple with the front bounding surface of the trench in which it is disposed, such that an optical signal incident on the front bounding surface will pass through the TEE and into the portion of silica wafer structure defining the back bounding surface of the trench. Upon contraction, the TEE will not optically couple to the front bounding surface, but will yield an air gap between the surface and TEE, such that an optical signal incident on the front bounding surface of the trench will be deflected through total internal reflection onto the switched path. This functionality is similar to that of NMSM embodiments previously described.

Each ORE has a first and second optic axis associated therewith. The first optic axis of each ORE is collinear with light incoming from the first direction, (arbitrarily shown as coming from the left). The second optic axis of each ORE is collinear or parallel with optical signals that have been deflected onto the switched path; the switched path is shown as downwardly extending. In a preferred embodiment the first and second optic axes of each ORE intersect at an angle of 120°.

NMSM 70 may further comprise first, second, third and fourth pluralities of waveguide segments respectively numbered 40a1 . . . .40a4, 40c1 . . . 40c4, 40b1 . . . 40b4, 40d1 . . .40d4. The various pluralities of waveguide segments, 40a1 . . . . 40a4, 40c1 . . .40c4, 40b1 . . . 40b4, 40d1 . . . 40d4 are designated in accord with the previous numbering regime and correspond to the pluralities of waveguide segments shown in FIGS. 1A and 3.

In some embodiments, collimators 42a14 42a4, 42c14 42c4, 42b–42b4, and 42d–42d4 may be disposed between the respective waveguides and silica wafer structure 78 as shown in FIG. 4A. The collimators are designated in accord with the previous numbering regime and correspond to the collimators in shown FIGS. 1A and 3.

Temperature Control Elements for Various Optical Routing Elements (OREs)

Figure 5A:
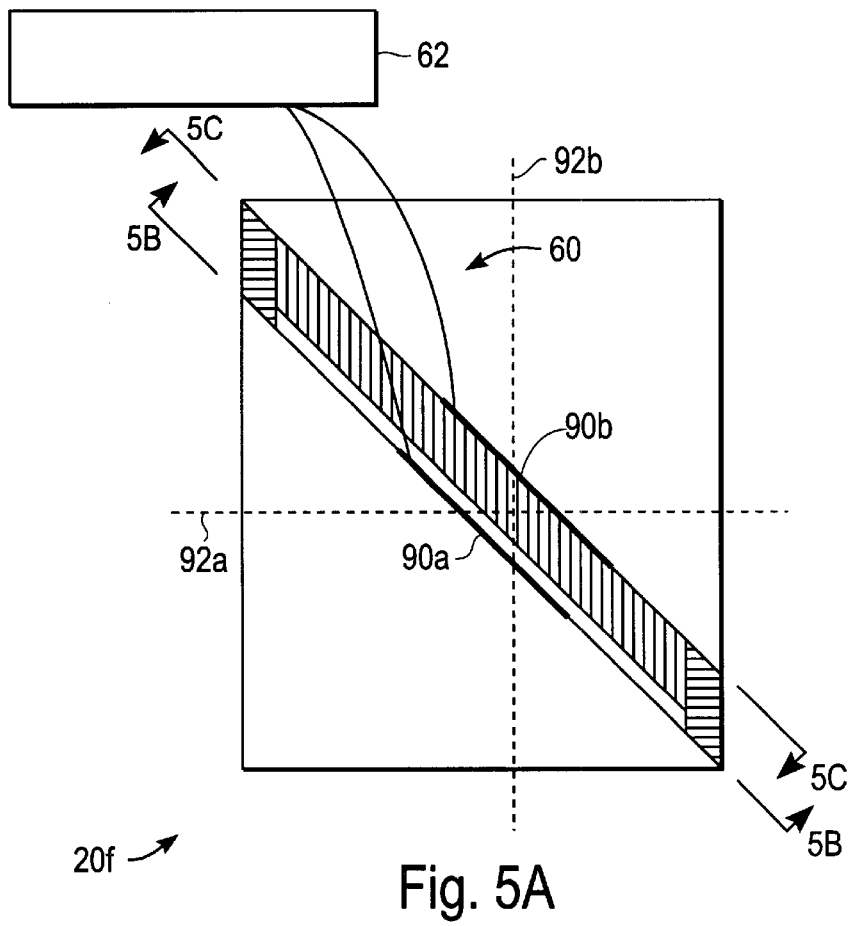
FIGS. 5A, 5B, and 5C are schematic top and cross sectional views of an ORE with resistive heating rings.
Figure 5B:
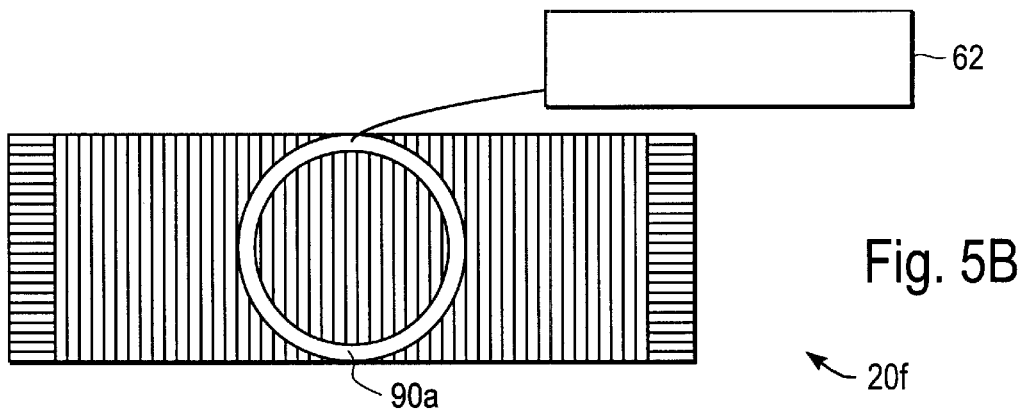
Figure 5C:
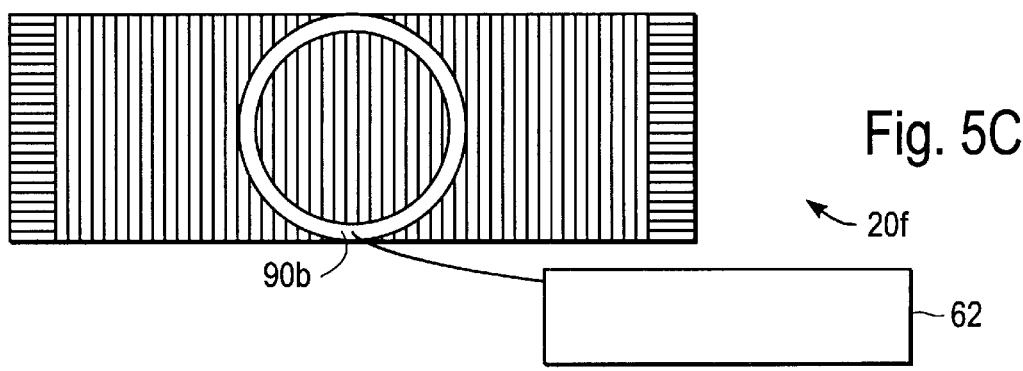

FIGS. 5A, 5B, and 5C are schematic plan and cross sectional views of embodiments of an ORE 20f, where temperature control element 60 includes a pair of resistive heating rings 90a and 90b. The openings of the resistive heating rings surround the first optic axis 92a and the second optic axis 92b of the ORE. FIG. 5B is a cross sectional view of ORE 20f shown in FIG. 5A taken along line 5B–5B. FIG. 5C is a cross sectional view of ORE 20f shown in FIG. 5A taken along line 5C–5C. Both FIGS. 5B and 5C show the ring shape of the resistive heating rings.

The resistive heating rings are formed from thin foils and sit between the TEE and the wafer prisms. The thin foils, in response to current supplied by temperature controller 62, warm and in turn raise the temperature of the TEE from a first temperature to a second temperature. At the first temperature the TEE is in its contracted state and at the second temperature it is in its expanded state. At the second temperature the TEE in its expanded state make direct physical contract with first wafer prism 50, thus causing the TEE and first wafer prism to be optically coupled. As such, optical signals traveling along the first optic axis will pass from first wafer prism 50, into the TEE and further pass into second wafer prism 52.

Although, FIGS. 5A, 5B, and 5C show control element 60 as a pair of resistive heating rings, control element 60 may comprise one resistive heating ring coupled between second wafer prism 52 and the TEE. Heating of the TEE need not be uniform, nor does the expansion of the TEE need to be uniform. It is sufficient that heat is supplied such that the TEE in its expanded state makes physical contract with the first wafer prism at the optic axes, and causes optical coupling of the TEE and first wafer prism, such that optical signals can pass between the first wafer prism and TEE.

Figure 6A:
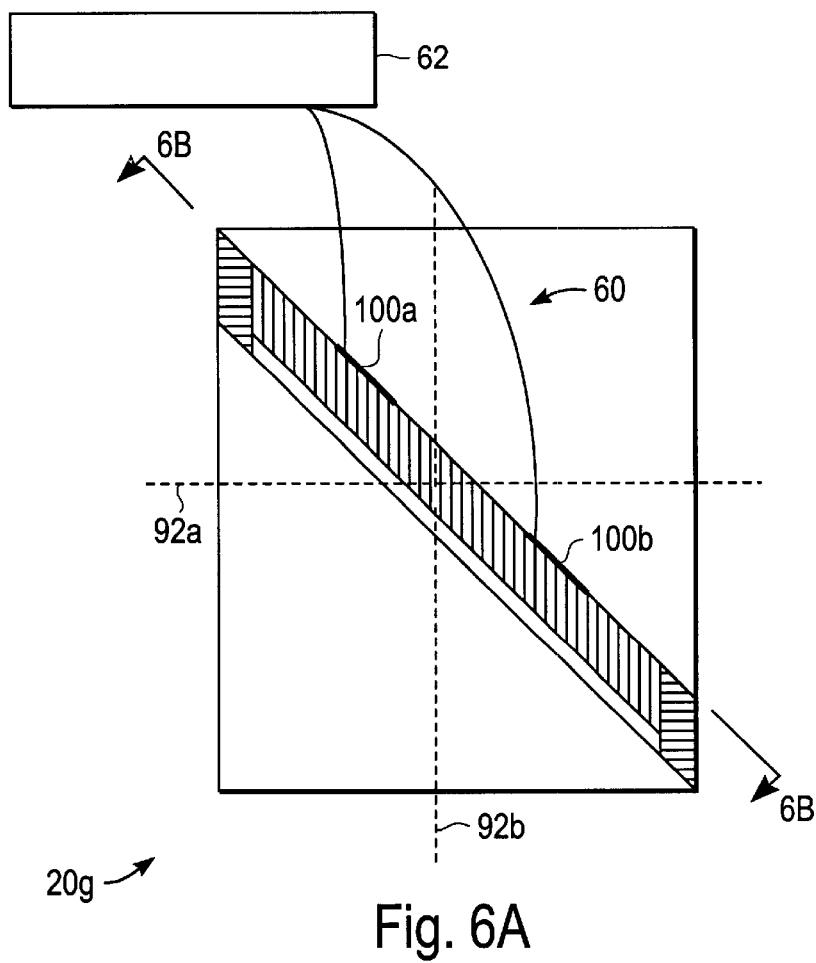
FIGS. 6A and 6B are schematic top and cross sectional views of an ORE with resistive heating elements.
Figure 6B:
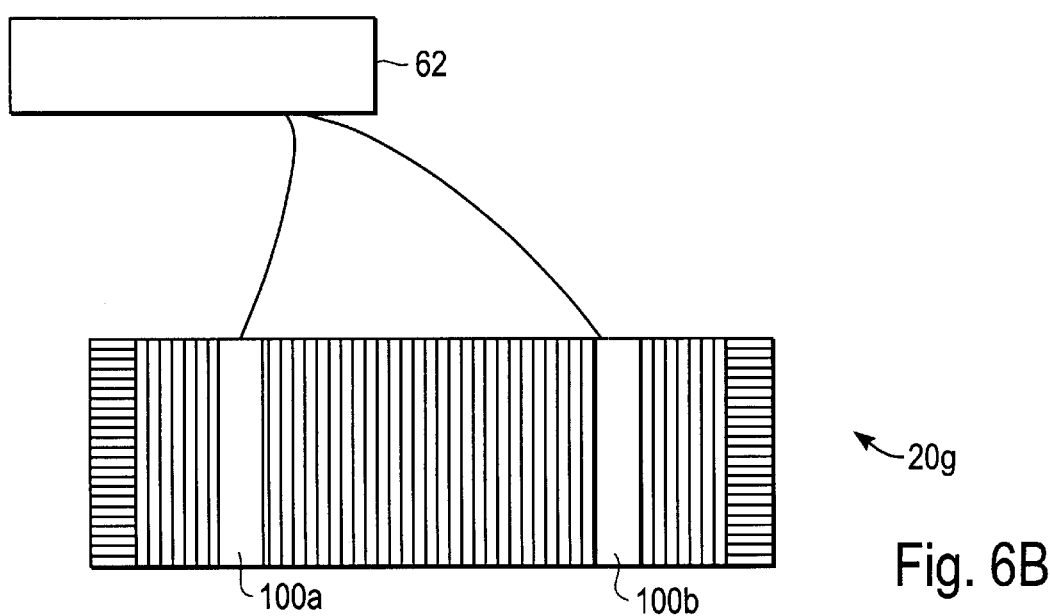

FIGS. 6A and 6B are schematic plan and cross sectional views of another embodiment of ORE 20g, where temperature control element 60 includes a pair of resistive heating elements 100a and 100b. The elements are disposed between TEE 56 and wafer prism 52. The first optic axis 92a and second optic axis 92b pass between the two elements. FIG. 6B is a cross sectional view of ORE 20g shown in FIG. 6A taken along the line 6B—6B. By way of example the elements are shown as rectangular in shape but may be of other useful shapes. Elements 100a and 100b are formed from thin resistive heating foils. As described above, the heating foils in response to current supplied by temperature controller 62, warm and in turn raise the temperature of the TEE from a first temperature, to a second temperature. Also as described above, the temperature rise causes the TEE to expand and make direct physical contract with wafer prism 50, thus causing the TEE and wafer prism to be optically coupled. As such, optical signals traveling along the first optic axis 92a will pass from wafer prism 50, into the TEE and further pass into wafer prism 52. Although, FIGS. 6A and 6B show temperature control element 60 as a pair of resistive heating elements, one resistive heating element may be used.

Figure 7:
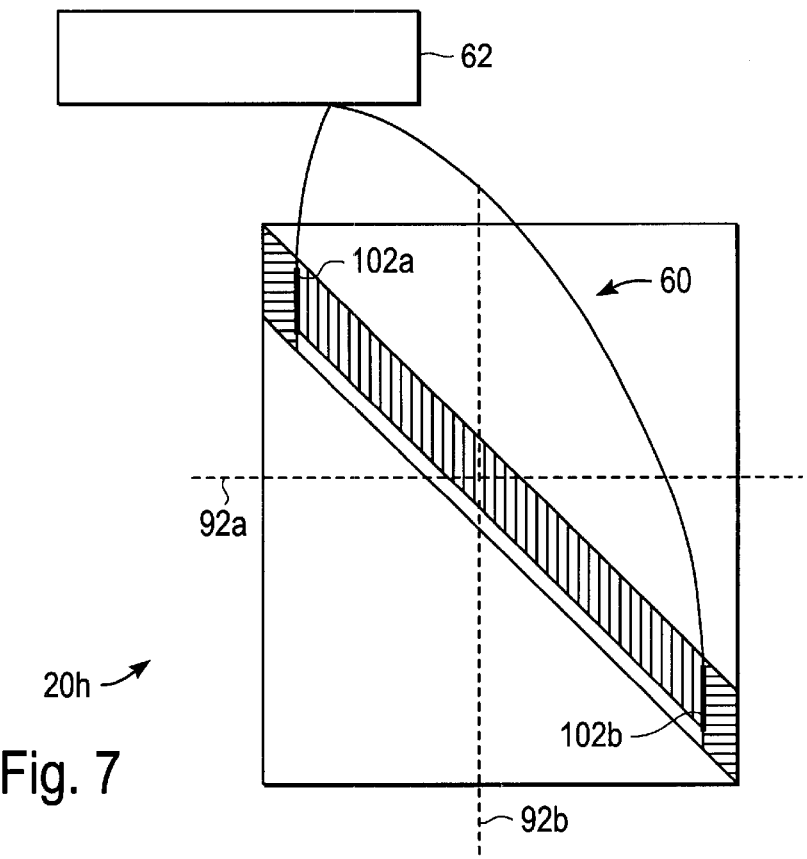
FIG. 7 is a schematic plan view of an ORE with resistive heating elements.

FIG. 7 is a schematic plan view of yet another embodiment of ORE 20h where control element 60 includes a pair of heating elements 102a and 102b disposed between TEE 56 and spacer elements 53. Each heating element is a thin film resistive heater that heats the TEE in response to current supplied by temperature controller 62, (as is similarly described above). The heating elements can be of various shapes, such as rectangular, oval or other useful shape. As described above, the heating foils in response to current supplied by temperature controller 62, warm and in turn raise the temperature of the TEE from a first temperature to a second temperature, which the temperature rise causes the TEE to expand and make direct physical contract with wafer prism 50. Although, FIG. 7 shows control element 60 as a pair of resistive heating elements, one resistive heating element may be used.

Those of skill in the art will undoubtedly recognize other useful configurations of control element 60 having thin heating foils that will satisfactorily raise the temperature of the TEE to a high temperature from a low temperature.

Figure 8:
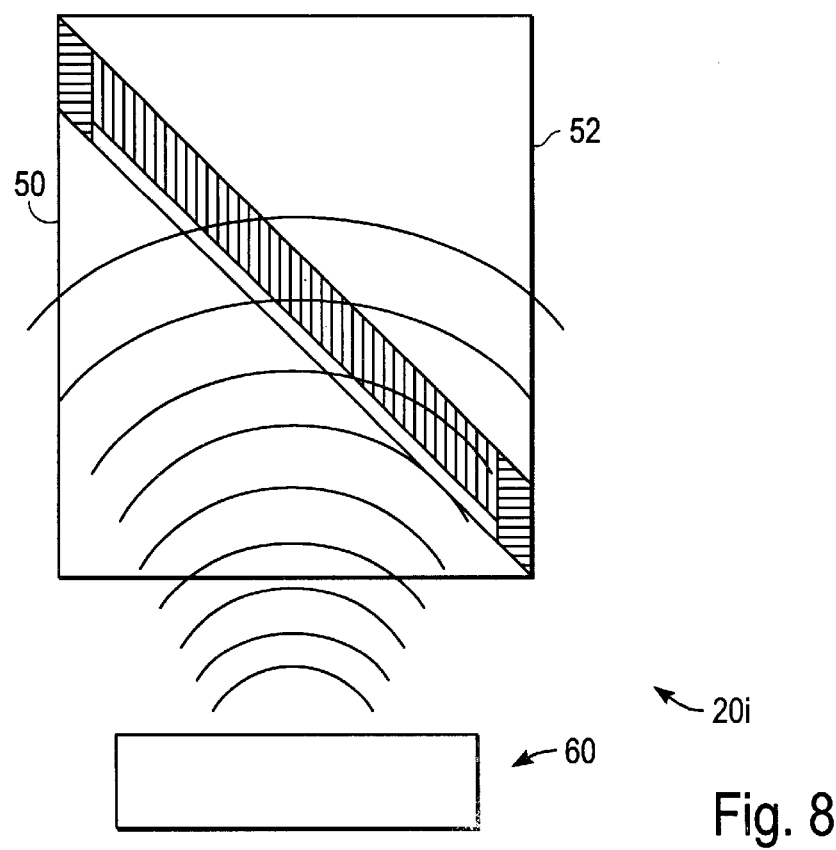
FIG. 8 is a schematic plan view of an ORE having a radiative heating source.

FIG. 8 shows an embodiment of an ORE 20i where control element 60 includes a radiation source. In this embodiment, radiative energy is transmitted from the radiation source and is absorbed by TEE 56 causing the TEE to rise from a first temperature to a second temperature, thus causing the TEE to transition from a contracted state to an expanded state. The wavelength of the radiative energy is such that it is transmitted by wafer prisms 50 and 52 and by silica wafer structure 30 (silica wafer structure is shown in FIGS. 1A–1B). The radiation source may be a laser, LED, or any other form of electromagnetic radiative generator. The TEE is a material such that an electromagnetic pulse in the range of 1–5 microseconds raises its temperature by the required amount to produce the transition from its contracted state to its expanded state. Further properties of the TEE are discussed in detail below.

Although, FIGS. 5A, 5B, 5C, 6A, 6B, 7, and 8 show various embodiments of temperature control element 60 in use with ORE having wafer prisms, each of the above embodiments of temperature control element 60 may be of use with ORE not having wafer prisms, such as ORE 20e shown in FIGS. 4A and 4B.

Wavezuide Intersection Angle Considerations

In the above discussion of the various switch matrix embodiments, it was assumed that total internal reflection occurred at the air gap. As a practical matter, this will be true so long as the air gap is long enough. Following is a more detailed discussion of the mechanism of total internal reflection.

It is well known to those skilled in the art that light traveling in a medium having a given index of refraction will in general be partially reflected and partially transmitted when it encounters an interface with a medium having a different index of refraction. The relative amounts of reflected and transmitted light depend on the refractive indices of the media and the angle of incidence, which is normally measured from the normal (or perpendicular) to the interface.

It is also well known that light traveling in a medium having a given index of refraction will be totally internally reflected at an interface with a medium having a lower index of refraction if the light is incident at an angle that is larger than what is referred to as the critical angle. The critical angle depends on the indices of refraction in the two media.

It is also well known that total internal reflection is an idealization in the sense that the light traveling in the high-index medium actually penetrates beyond the interface with the low-index medium. This is referred to as the evanescent wave. If the low-index medium is a layer sandwiched between regions of high-index material, and if this layer is sufficiently thin, some of the light will actually pass through the layer of low-index material and enter the remote region of high-index material.

Figure 9:
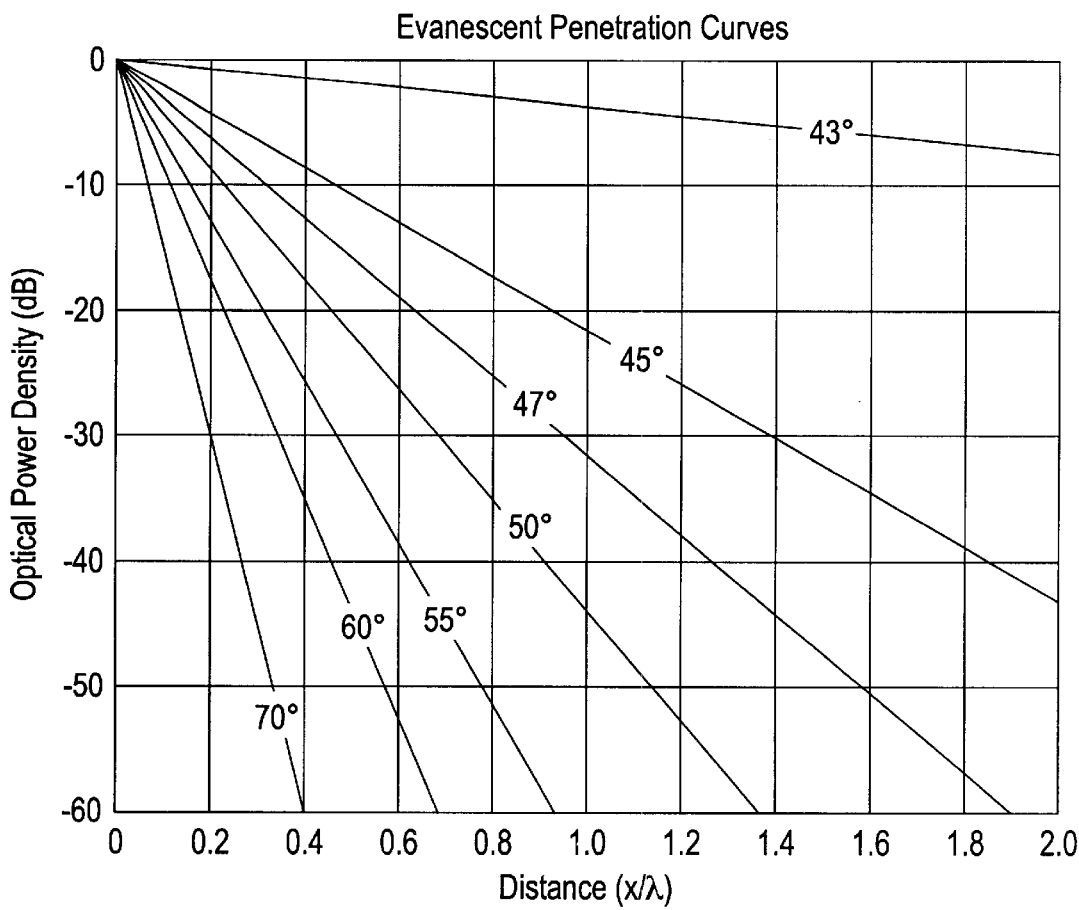
FIG. 9 is a graph showing the dependence of evanescent wave decay on incident angle.

FIG. 9 is a graph showing the dependence of evanescent wave decay on incident angle for the specific case of interest here, namely an embodiment where the high-index medium is silica with a refractive index of 1.468 and the low-index medium is air or vacuum with a refractive index of 1. The graph shows the light power density (in dB) as a function of distance (normalized in units of the wavelength) for various angles of incidence. The figures illustrating the embodiments described above show an angle of incidence of 45°, which corresponds to the wafer prisms being right isosceles triangles. As can be seen in FIG. 9, the optical power density is only attenuated to −30 dB at a distance of 1.4 wavelengths from the interface. It is generally desired to have crosstalk below −50 dB, which means that the air gap for the TEE needs to be more than 2.5 wavelengths (about 3.9 microns at a wavelength of 1550 nm). However, as can also be seen, the behavior is quite sensitive to incident angle, and at an incident angle of 60°, the air gap need only be about 0.6 wavelengths (less than a micron) for the attenuation to be at the -50 dB level.

Figure 10:
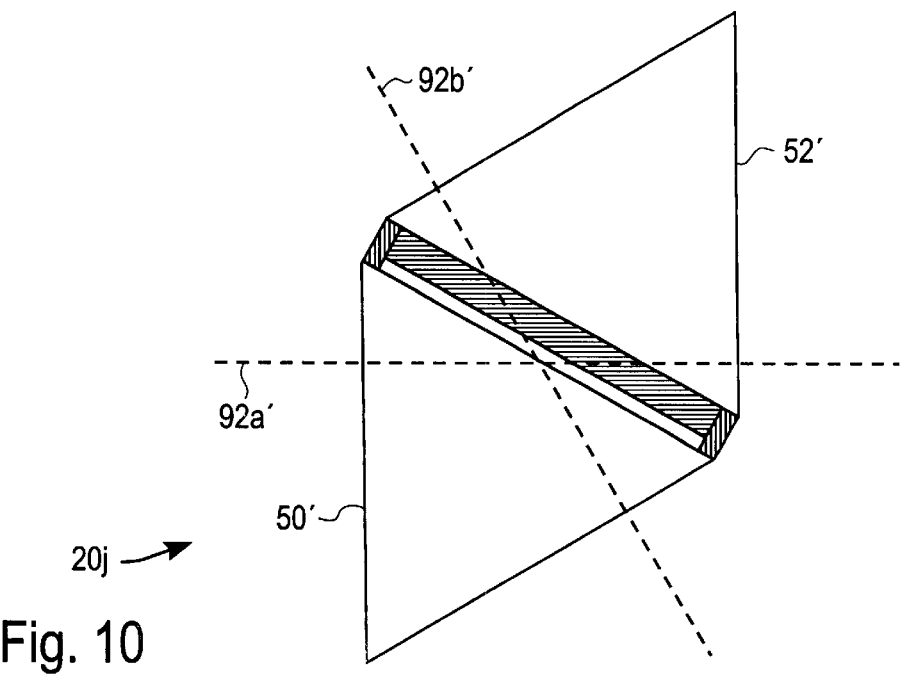
FIG. 10 is a schematic plan view of an ORE with 60° incident angles.

FIG. 10 is a schematic plan view of an ORE 20j that includes first and second wafer prisms 50' and 52' having equilateral triangular dimensions. In this embodiment the first optic axis 92a' of the ORE intersects the front gap surface 54 at an angle of 60° from the normal so that light traveling along the first optic axis, when reflected along the second optic axis 92b', undergoes a 120° deflection. ORE 20j is of particular use in NMSM 10, (previously described). To effect a 60° angle of incidence in NMSM 70, (previously described) the trenches can be formed in the silica wafer structure such that incoming light is incident upon a trench at 60°.

Figure 11:
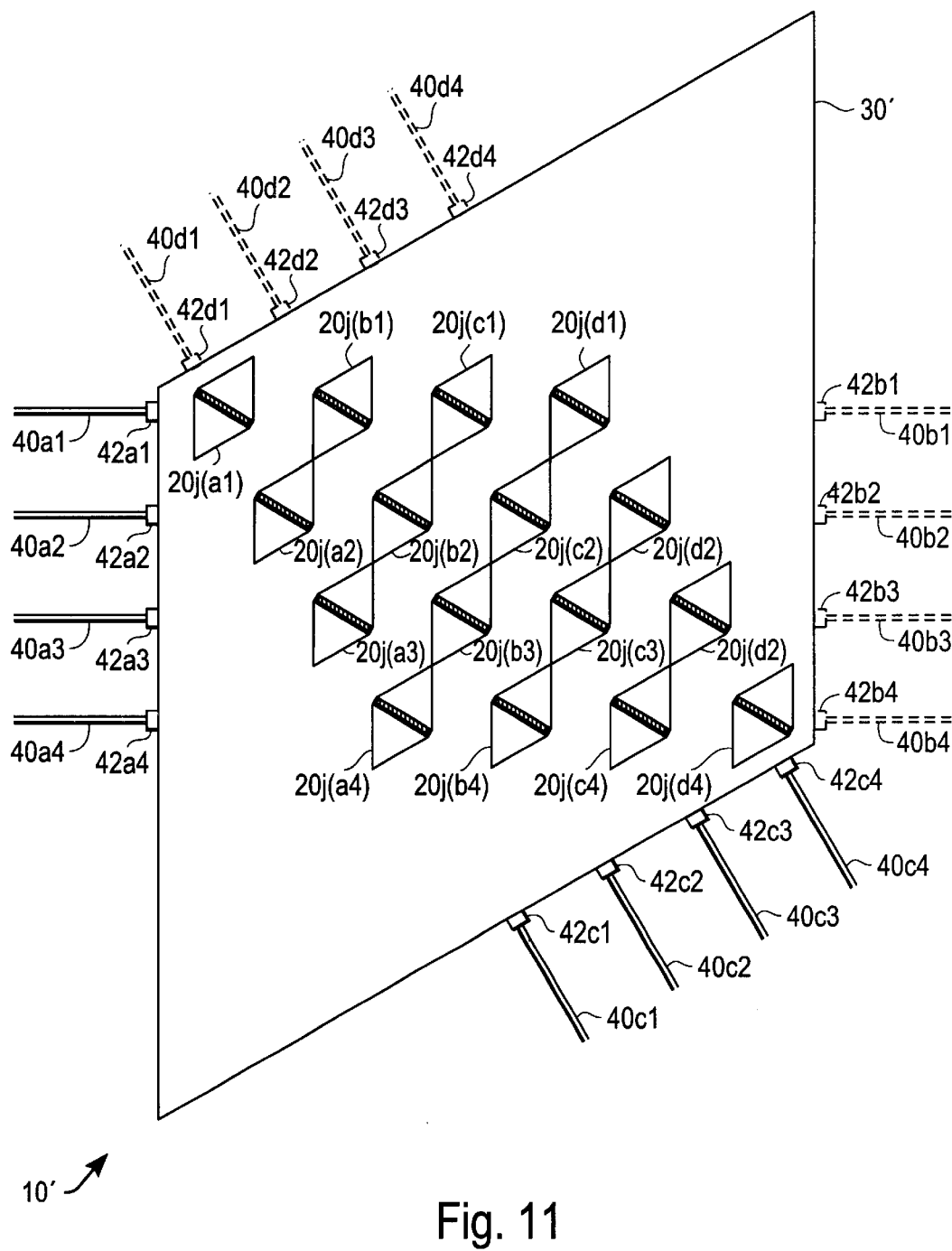
FIG. 11 is a schematic plan view of a non-blocking micro-optic switch matrix.

FIG. 11 is a schematic plan view of an NMSM 10' according to a switch embodiment of the present invention. NMSM 10' includes a plurality of OREs 20j arranged in an array or matrix. Each ORE 20j is shown with a suffixed reference numeral, with a first suffix (a,.b, c, d, . . . ) designating the column (aligned at 60° from the vertical of the drawing) position and a second suffix (1, 2, 3, 4, . . . ) designating the row position. As illustrated, the non-blocking micro-micro optic switch matrix is an N×N matrix of OREs, having four rows and four columns, but matrices of lower or higher dimensions may also be useful. Additionally, matrix dimensions that are non-symmetric, i.e., M×N matrices (where M and N are unequal), are of use in some devices and applications. All NMSM attributes in embodiments previously described and shown in FIGS. 1A, 1B and 4A are present in NMSM 10'. Although, NSMS 10' as shown in FIG. 11 is shown with OREs 20j, the OREs may also be formed as ORE in trenches as shown in FIGS. 4A and 4B.

As previously described, the basic functionality of each ORE is to receive light incoming from a first direction, arbitrarily shown as coming from the left, and selectively pass it onto a through path (i.e., to the right), or deflect it onto a switched path (shown as extending 60° down from the horizontal of the drawing). An additional functionality of each ORE is to receive light incoming from a second direction, arbitrarily shown as coming from 60° left of vertical, and selectively pass it onto a through path (i.e., shown as extending 60° right of vertical), or deflect it onto a switched path, (i.e., to the right). As previously described, each ORE can be controlled to assume first and second states that determine whether light will travel onto a through path or onto a switched path.

As described above, a first plurality of waveguide segments 40a1 . . . 40a4 serves as a set of input waveguide segments and a second plurality of waveguide segments 40c1 . . . . 40c4 serves as a set of output waveguide segments. Also as described above, optional third and fourth pluralities of waveguide segments 40b1 . . . 40b4 and 40d1 . . . 40d4 (shown in phantom) are of use in some embodiments. The waveguide segments are designated in accord with the previous numbering regime and correspond to the waveguide segments shown in FIGS. 1A, 3 and 4A.

Each of the waveguide segments may be an optical fiber, monolithic planar waveguide, or other suitable waveguide material. In some embodiments, particularly those having waveguide segments that are optical fibers, collimators 42a1–42a4, 42c1–42c4, 42b1–42b4, and 42d1–42d4 may be disposed between the respective waveguides and silica wafer structure 30' as shown in FIG. 11. The collimators are designated in accord with the previous numbering regime and correspond to the collimators shown in FIGS. 1A, 3 and 4A. Such collimating devices are preferably GRIN lenses. While FIG. 11 shows the waveguide segments and collimators as discrete elements, they may be fabricated as a single structure. Further, while FIG. 11 shows the waveguide segments and/or collimators coupled to the periphery of the silica wafer structure, the silica wafer may be further etched or cut allowing the waveguide segments and/or collimators to be directly coupled to the peripheral OREs.

Thermal Expansion Element (TEE) Material Considerations

Relevant physical properties for the TEE material include light transmission, refractive index, coefficient of thermal expansion, and glass transition temperature. Also to be considered are the changes of these properties with time or through repeated small cyclic deformations due to the thermal expansion and contraction that occur during operation of the routing element.

The material for the TEE is preferably a polymeric material, which is made up of large chain-like molecules. Polymers can be rubbery or glassy-the former are typically referred to as elastomers, the latter plastics. The properties are determined by the chemical composition of the links in the chain (monomers), the molecular architecture (i.e., the length of the chain, and the branching and network structure), and the solid state morphology (i.e., the way that the chains are arranged or packed together). These factors can be tailored to provide a high degree of flexibility in the design. That is, polymers can be designed to exhibit a wide range of properties by suitably varying these factors. Composition-property relationships are known for estimating the values for certain properties.

Regarding molecular architecture and solid state morphology, the material should be an elastic, transparent, isotropic solid that is easily and reversibly deformable. This is essentially the definition of a crosslinked elastomeric material (an elastomer being a very high molecular weight polymer with a glass transition temperature well below ambient temperature).

The refractive index depends very strongly on composition, and can be varied over a wide range from 1.35 to 1.6 or more. The glass transition temperature is also strongly dependent on composition. The linear coefficient of thermal expansion can be varied for elastomers over a range of $1.5–3.0 \times 10^{-4}/°$ C. Generally, elastomers have higher thermal expansion coefficients than plastics (say on the order of a factor of 2), which is another reason that an elastomeric material is preferred. Absorbance should be low for most organic polymers, and can be minimized by choosing structures that do not have strong absorbance features in the near infrared.

While the refractive index of the TEE is less important when the TEE is in the contracted state (therefore defining the total internal reflection mode), it can be a concern when the TEE is in the expanded state. In this state, Fresnel reflections arising from an index mismatch could give rise to crosstalk since a small fraction of the light, all of which is nominally to be transmitted, could be reflected. Fortunately, the crosstalk is likely to be at a permissibly low level for realistic changes in refractive index. For example, for refractive index values ±0.002 from a nominal refractive index of 1.468, the crosstalk for an 8×8 switch array is −51 dB and for a 16×16 switch array is −47.5 dB. This stated mismatch of refractive index is larger than would be expected in typical situations, and so the crosstalk for actual embodiments is generally within a permissible range of values.

Achieving a desired refractive index for a polymer can be achieved by copolymerization. As is well known, the composition of a polymer can be varied by combining two or more different monomer units to form the polymer chain (i.e., copolymerization). For example, it is possible to make a silicone elastomer (polysiloxane) by combining dimethyl siloxane units (refractive index of 1.41) with methylphenysiloxane units (refractive index of 1.53) in the proper ratio to obtain a copolymer with refractive index of 1.47 to match the refractive index of silica (the waveguide material). These components are commercially available and techniques for combining them are well known. A similar approach can be use to design acrylic or other families of polymers to achieve the desired refractive index.

Properties of elastomeric materials change with time primarily as a result of chemical changes induced by photolysis, oxidation, or hydrolysis. Since the material will generally not be exposed to ultraviolet radiation, oxygen, or moisture, this should not be a problem. Physical aging under mechanical stress, while possible since cyclical deformation could lead to fatigue (cracking) or compression set, is unlikely in view of the small deformations involved.

Fabricating the Thermal Expansion Element (TEE)

FIGS. 12A, 12B, and 12C are schematic views showing a first technique for fabricating TEE 56 as shown in FIGS. 2A, 2B, 4A, and 10. FIG. 12A shows a gap 114 with surrounding structure 116 shown in phantom. Gap 114 is representative of the gap previously described and as shown in FIGS. 2A, 2B and 10 and is also representative of the trenches 74 shown in FIGS. 4A and 4B into which OREs 20e are disposed. In this technique, formable material 112 (preferably a polymer) is introduced into gap 114, allowed to set so that at temperature T(high) it fills the gap and at temperature T(low) it contracts to define an air gap. As illustrated, surface 120 may be formed with anchoring indentations to capture material introduced therein. FIG. 12B shows the gap with a material 112 introduced so as to fill the gap. FIG. 12C shows the result of lowering the temperature of the material and surrounding structure to a temperature at or below T(low) so that the material contracts, separating from surface 128, but adhering to surface 120. The separation of the formable material 112 from surface 128 provides an air gap 130.

FIGS. 13A, 13B, 13C, and 13D are schematic views showing a second technique for fabricating TEE 56. Primed reference numerals are used for elements corresponding to those in FIGS. 12A–12C. In this technique, an already formed material is used, as will now be described. As in the first technique, a gap 114' surface 120' may be treated to promote adhesion. As shown in FIG. 13B, a preformed element 112' of resilient material is introduced into gap 114'. Element 112' preferably has a plano-convex profile, and its flat surface is preferably coated with an adhesive layer 132. Element 112' is preferably chilled to a temperature below T(low) so that it is sufficiently contracted to ease insertion.

FIG. 13C shows the result of heating element 112' and the gap structure to a temperature at or above T(high), so that the element expands to contact the surface 128' of the gap. Note that TEE 56 extends transversely beyond the transverse extent of an optical signal incident on the TEE, so in the expanded state, element 112' need only make optical contact with surface 128' over a central region having an area larger than the transverse area of the incident optical signal. It is preferred to heat the element sufficiently above T(high) to exert extra pressure on adhesive layer 132. FIG. 13D shows the result of lowering the temperature of element 112' to a temperature at or below T(low). At this temperature, element 112' contracts, with its flat surface remaining adhered to the cavity and its curved surface separated from cavity surface 128' to provide an air gap 130'.

Wafer Prism and Silica Wafer Structure Considerations

Relevant physical properties for the wafer prisms and silica wafer structure include refractive index, and thickness. Insertion loss and crosstalk are effectively minimized through the avoidance of Fresnel reflections at the interfaces of the various elements, such as the waveguide segment/GRIN lens interface with the silica wafer structure, and the interface of the silica wafer structure with the wafer prisms. Fresnel reflections caused by refractive index mismatches at the interfaces of the various elements listed above can be minimized by using elements of the same material. In a preferred embodiment, the above recited elements are silica and thus have matched refractive indices of 1.468. Thus, insertion loss and crosstalk can be minimized to acceptable levels. The thickness of both the wafer prisms and silica wafer structure can be equal to or greater than the diameter of the waveguide segments and/or GRIN lenses. Thus, the NMSM can have a desired small overall size.

Conclusion

While the above is a complete description of specific embodiments of the invention, various modifications, alternative constructions, and equivalent may be used while preserving the fundamental invention of the embodiments. For example, wafer prisms could be fixed to a silica wafer structure without the use of spacers elements used to fix the gap width between the prisms. Thus, the above description should not be taken as limiting the scope of the invention as defined by the claims.

What is claimed is:

1. A non-blocking micro-optic switch matrix comprising:
    a plurality of optical routing elements forming an M×N matrix of optical routing elements, said matrix having a plurality of M rows and a plurality of N columns, each row of said M rows has N said optical routing elements and each said column of said plurality of N columns has M said optical routing elements, wherein M and N are equal or not equal, each said optical routing element in one row of said plurality of M rows may be optically coupled to the other said optical routing elements in said one row, each said optical routing element in one column of said plurality of N columns may be optically coupled to the other said optical routing elements in said one column, wherein
    each said optical routing element of said plurality comprises
        first and second wafer prisms, having a gap disposed therebetween, said gap having a front bounded by said first wafer prism, a back bounded by said second wafer prism, and
        a body of transparent solid material disposed in said gap, between said first and second wafer prisms, said body having a contracted state at a first temperature and an expanded state at a second temperature, wherein said contracted state defines an air gap disposed in the path of light traveling along a first optic axis of said prisms, so as to cause said light to be deflected along a second optic axis of said prisms through total internal reflection, said second optic axis having a non-zero angle with respect to said first optic axis, and said expanded state removes said air gap disposed in the path of light traveling along said first optic axis so as to allow said light to pass from said first wafer prism, through said body, and into said second wafer prism.

2. The non-blocking micro-optic switch matrix of claim 1, wherein said first and second wafer prisms have respective first and second rigid faces adjacent said gap, said body is attached to said second rigid face, and said body contacts said first rigid face in said expanded configuration but not in said contracted configuration.

3. The non-blocking micro-optic switch matrix of claim 2, and further comprising:
    a silica wafer structure formed with recesses in which said optical routing elements are disposed.

4. The non-blocking micro-optic switch matrix of claim 3, and further comprising:
    a substrate device having a top surface upon which said silica wafer structure is disposed.

5. The non-blocking micro-optic switch matrix of claim 2, and further comprising:
    a substrate device having a top surface upon which said optical routing elements are disposed.

6. The non-blocking micro-optic switch matrix of claim 3, and further comprising:
    a first plurality of waveguide segments for delivering optical signals to said M×N matrix of optical routing elements, wherein each said waveguide segment of said first plurality is optically coupled to a first optical routing element in each row of said plurality of M rows in a one-to-one manner; and
    a second plurality of waveguide segments for receiving optical signals from said M×N matrix of optical routing elements, wherein each said waveguide segment of said second plurality is optically coupled to a last optical routing element in each column of said plurality of N columns in a one-to-one manner.

7. The non-blocking micro-optic switch matrix of claim 6, and further comprising:
    a third plurality of waveguide segments for receiving optical signals from said M×N matrix of optical routing elements, wherein each said waveguide segment of said third plurality is optically coupled to a last optical routing element in each row of said plurality of M rows in a one-to-one manner.

8. The non-blocking micro-optic switch matrix of claim 6, and further comprising:
    an additional plurality of waveguide segments for delivering optical signals to said M×N matrix of optical routing elements, wherein each said waveguide segment of said additional plurality of waveguide segments is optically coupled to a first optical routing element in each column of said plurality of N columns in a one-to-one manner.

9. The non-blocking micro-optic switch matrix of claim 6, and further comprising:
a first plurality of collimators coupled between each of said first plurality of waveguide segments and said first optical routing element in each row of said M rows in a one-to-one manner; and
a second plurality of collimators coupled between each of said second plurality of waveguide segments and said last optical routing element in each column of said N columns in a one-to-one manner.

10. The non-blocking micro-optic switch matrix of claim 7, and further comprising:
a plurality of collimators coupled between said third plurality of waveguide segments and said last optical routing element in each row of said M rows in a one-to-one manner.

11. The non-blocking micro-optic switch matrix of claim 8, and further comprising:
a plurality of collimators coupled between said additional plurality of waveguide segments and first optical routing element in each column of said N columns in a one-to-one manner.

12. The non-blocking micro-optic switch matrix of claim 1, wherein M and N are equal.

13. The non-blocking micro-optic switch matrix of claim 1, wherein M and N are not equal.

14. The non-blocking micro-optic switch matrix of claim 6, wherein each of said first and second wafer prisms of said plurality of optical routing elements have equilateral triangular dimensions.

15. The non-blocking micro-optic switch matrix of claim 14, wherein said first and second optic axes of each optical routing element of said plurality cross at a 120° angle.

16. The non-blocking micro-optic switch matrix of claim 1, and further comprising:
a pair of spacer elements; and
a pair of sides of said gap, wherein said pair of spacer elements bounds said pair of sides of said gap.

17. The non-blocking micro-optic switch matrix of claim 16, wherein said gap is in a range of about 100–200 micrometers wide.

18. The non-blocking micro-optic switch matrix of claim 7, wherein said first and second plurality of waveguide segments are segments of optical fiber.

19. The non-blocking micro-optic switch matrix of claim 1, wherein said transparent material is an elastomeric material.

20. The non-blocking micro-optic switch matrix of claim 1, and further comprising:
a plurality of temperature controllers; and
a plurality of temperature controller elements, wherein said temperature controllers of said plurality are coupled to said temperature control elements of said plurality in a one-to-one manner, and said temperature control elements are thermally coupled to said body of each said optical routing element of said plurality in a one-to-one manner.

21. The non-blocking micro-optic switch matrix of claim 20, wherein each said temperature control element of said plurality includes a pair of resistive heating rings, wherein said heating rings are thin foils having a central opening surrounding said first and second optic axis.

22. The non-blocking micro-optic switch matrix of claim 20, wherein each said temperature control element of said plurality includes a pair of resistive heating elements, wherein said resistive heating elements are thin foils being positioned along said back of said gap.

23. The non-blocking micro-optic switch matrix of claim 20, wherein each said temperature control element of said plurality includes a pair of resistive heating elements, wherein said resistive heating elements are thin foils being positioned along said sides of said gap.

24. The non-blocking micro-optic switch matrix of claim 20, wherein each said temperature control element of said plurality includes a radiation source.

25. A non-blocking micro-optic switch matrix comprising:
a silica wafer structure, said silica wafer structure having a plurality of trenches, wherein each trench has a front bounding surface and a back bounding surface defining a gap; and
a plurality of optical routing elements forming an M×N matrix, said matrix having a plurality of M rows and a plurality N columns, each row of said plurality of M rows has N said optical elements and each said column of said plurality of N columns has M said optical routing elements, wherein M and N are equal or not equal, each said optical routing element in one row of said plurality of M rows may be optically coupled to the other said optical routing elements in said one row, each said optical routing element in one column of said plurality of N columns may be optically coupled to the other said optical routing elements in said one column, wherein
each said optical routing element comprises a body of transparent solid material disposed in said gap, between said first and second bounding surfaces, said body having a contracted state at a first temperature and an expanded state at a second temperature, wherein said contracted state defines an air gap disposed in the path of light traveling along a first optic axis of said optical routing element, so as to cause said light to be deflected along a second optic axis of said optical routing element through total internal reflection, said first optic axis having a non-zero angle with respect to said second optic axis, and said expanded state removes said air gap disposed in the path of light traveling along said first optic axis so as to allow said light to pass through said first bounding surface, through said body, and into portions of said silica wafer structure bounded by said back bounding surface.

26. The non-blocking micro-optic switch matrix of claim 25, wherein said body is attached to said back bounding surface of said trench in which it is disposed, and said body contacts said front bounding surface in said expanded configuration but not in said contracted configuration.

27. The non-blocking micro-optic switch matrix of claim 26, and further comprising:
a substrate device upon which said silica wafer structure is disposed.

28. The non-blocking micro-optic switch matrix of claim 27, and further comprising:
a first plurality of waveguide segments for delivering optical signals to said M×N matrix of optical routing elements and extending from a first peripheral edge of said silica wafer structure, each said waveguide segment of said first plurality being optically coupled to a first optical routing element in each row of said plurality of M rows in a one-to-one manner; and
a second plurality of waveguide segments for receiving optical signals from said M×N matrix of optical routing elements and extending from a second peripheral edge of said silica wafer structure, each said waveguide segment of said second plurality being optically coupled to a last optical routing element in each column of said plurality of N columns in a one-to-one manner, wherein said first and second peripheral edges are along adjacent sides of said silica wafer structure.

29. The non-blocking micro-optic switch matrix of claim 28, and further comprising:

a third plurality of waveguide segments for receiving optical signals from said M×N matrix of optical routing elements and extending from a third peripheral edge of said silica wafer structure, each said waveguide segment of said third plurality being optically coupled to a last optical routing element in each row of said plurality of M rows in a one-to-one manner, wherein said third peripheral edge is opposite said first peripheral edge and is adjacent said second peripheral edge.

30. The non-blocking micro-optic switch matrix of claim 28, and further comprising:

an additional plurality of waveguide segments for delivering optical signals to said M×N matrix of optical routing elements and extending from a fourth peripheral edge of said silica wafer structure, each said waveguide segment of said additional plurality of waveguide segments being optically coupled to a first optical routing element in each column of said plurality of N columns in a one-to-one manner, wherein said fourth peripheral edge is opposite said second peripheral edge and is adjacent said first peripheral edge.

31. The non-blocking micro-optic switch matrix of claim 28, and further comprising:

a plurality of collimators coupled in a one-to-one manner between each of said first and second plurality of waveguide segments and said silica wafer structure.

32. The non-blocking micro-optic switch matrix of claim 29, and further comprising:

a plurality of collimators coupled in a one-to-one manner between said third plurality of waveguide segments and said silica wafer structure.

33. The non-blocking micro-optic switch matrix of claim 30, and further comprising:

a plurality of collimators coupled in a one-to-one manner between said additional plurality of waveguide segments and said silica wafer structure.

34. The non-blocking micro-optic switch matrix of claim 25, wherein M and N are equal.

35. The non-blocking micro-optic switch matrix of claim 25, wherein M and N are not equal.

36. The non-blocking micro-optic switch matrix of claim 28, wherein said first and second optic axes of each optical routing element of said plurality cross at a 120° angle.

37. The non-blocking micro-optic switch matrix of claim 25, wherein said gap is in a range of about 100–200 micrometers wide.

38. The non-blocking micro-optic switch matrix of claim 28, wherein said first and second plurality of waveguide segments are segments of optical fiber.

39. The non-blocking micro-optic switch matrix of claim 25, wherein said transparent material is an elastomeric material.

40. The non-blocking micro-optic switch matrix of claim 25, wherein each said optical routing element of said plurality further comprises a temperature control element coupled to said body and a temperature controller coupled to said temperature control element.

41. The non-blocking micro-optic switch matrix of claim 40, wherein each said temperature control element includes a pair of resistive heating rings, wherein said heating rings are thin foils having a central opening surrounding said first and second optic axis.

42. The non-blocking micro-optic switch matrix of claim 40, wherein each said temperature control element includes a pair of resistive heating elements, wherein said resistive heating elements are thin foils being positioned along said back bounding surface.

43. The non-blocking micro-optic switch matrix of claim 40, wherein each said temperature control element of said plurality includes a pair of resistive heating elements, wherein said resistive heating elements are thin foils being positioned along each side of said body.

44. The non-blocking micro-optic switch matrix of claim 40, wherein said temperature control element includes a radiation source.

\* \* \* \* \*